(12) United States Patent
Berne

(10) Patent No.: US 10,759,354 B2
(45) Date of Patent: Sep. 1, 2020

(54) CAMERA USED AS A VEHICLE SIZE REFERENCE AND VEHICLE EQUIPPED WITH THE SAME

(71) Applicant: VOLVO TRUCK CORPORATION, Gothenburg (SE)

(72) Inventor: Nicolas Berne, Heyrieux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 33 days.

(21) Appl. No.: 16/092,340

(22) PCT Filed: Apr. 15, 2016

(86) PCT No.: PCT/IB2016/000634
§ 371 (c)(1),
(2) Date: Oct. 9, 2018

(87) PCT Pub. No.: WO2017/178859
PCT Pub. Date: Oct. 19, 2017

(65) Prior Publication Data
US 2019/0126847 A1 May 2, 2019

(51) Int. Cl.
| | |
|---|---|
| *B60R 11/04* | (2006.01) |
| *B60R 1/074* | (2006.01) |
| *B60R 1/00* | (2006.01) |
| *H04N 5/225* | (2006.01) |
| *B60R 11/00* | (2006.01) |
| *B60R 1/12* | (2006.01) |

(52) U.S. Cl.
CPC .............. *B60R 11/04* (2013.01); *B60R 1/00* (2013.01); *B60R 1/074* (2013.01); *H04N 5/2253* (2013.01); *H04N 5/2254* (2013.01); *B60R 2001/1253* (2013.01); *B60R 2011/004* (2013.01); *B60R 2011/008* (2013.01); *B60R 2011/0085* (2013.01); *B60R 2011/0092* (2013.01); *B60R 2300/8046* (2013.01); *B60Y 2200/148* (2013.01)

(58) Field of Classification Search
None
See application file for complete search history.

(56) References Cited

U.S. PATENT DOCUMENTS

2003/0169160 A1* 9/2003 Rodriguez Barros ...................... B60Q 1/2665
340/426.1
2008/0055411 A1* 3/2008 Lee ........................ B60R 1/00
348/148

(Continued)

FOREIGN PATENT DOCUMENTS

| DE | 202005006903 U1 | 8/2006 |
|---|---|---|
| DE | 102011113323 A1 | 5/2012 |

(Continued)

OTHER PUBLICATIONS

International Search Report (dated Jul. 4, 2016) for corresponding International App. PCT/IB2016/000634.

*Primary Examiner* — Kate H Luo
(74) *Attorney, Agent, or Firm* — Withrow & Terranova, PLLC

(57) ABSTRACT

An active optical device for a vehicle, which is also used as a visual reference for the driver, is provided to manage the external dimensions of the vehicle. Such an active optical device can take several positions, such as a driving position, in which it is visible from the driver, and folded positions.

17 Claims, 2 Drawing Sheets

(56) References Cited

U.S. PATENT DOCUMENTS

| | | | |
|---|---|---|---|
| 2010/0165100 A1* | 7/2010 | Asai | B60R 1/00 |
| | | | 348/135 |
| 2012/0217764 A1* | 8/2012 | Ishiguro | B60R 1/00 |
| | | | 296/1.07 |
| 2012/0314075 A1* | 12/2012 | Cho | B60R 1/00 |
| | | | 348/148 |
| 2014/0092495 A1* | 4/2014 | Bowers | B60R 1/06 |
| | | | 359/841 |
| 2014/0376119 A1* | 12/2014 | Sobecki | B60R 1/074 |
| | | | 359/841 |
| 2016/0214536 A1* | 7/2016 | Burdge | B60R 1/007 |
| 2016/0243988 A1* | 8/2016 | Peterson | B60R 1/072 |
| 2017/0101057 A1* | 4/2017 | Hein | B60R 1/06 |
| 2017/0166169 A1* | 6/2017 | Muller | B60R 25/24 |
| 2017/0210282 A1* | 7/2017 | Rodriguez Barros | G03B 21/00 |

FOREIGN PATENT DOCUMENTS

| | | |
|---|---|---|
| DE | 102015008552 A1 | 1/2016 |
| WO | 0062112 A1 | 10/2000 |
| WO | 2008146149 A1 | 12/2008 |

\* cited by examiner

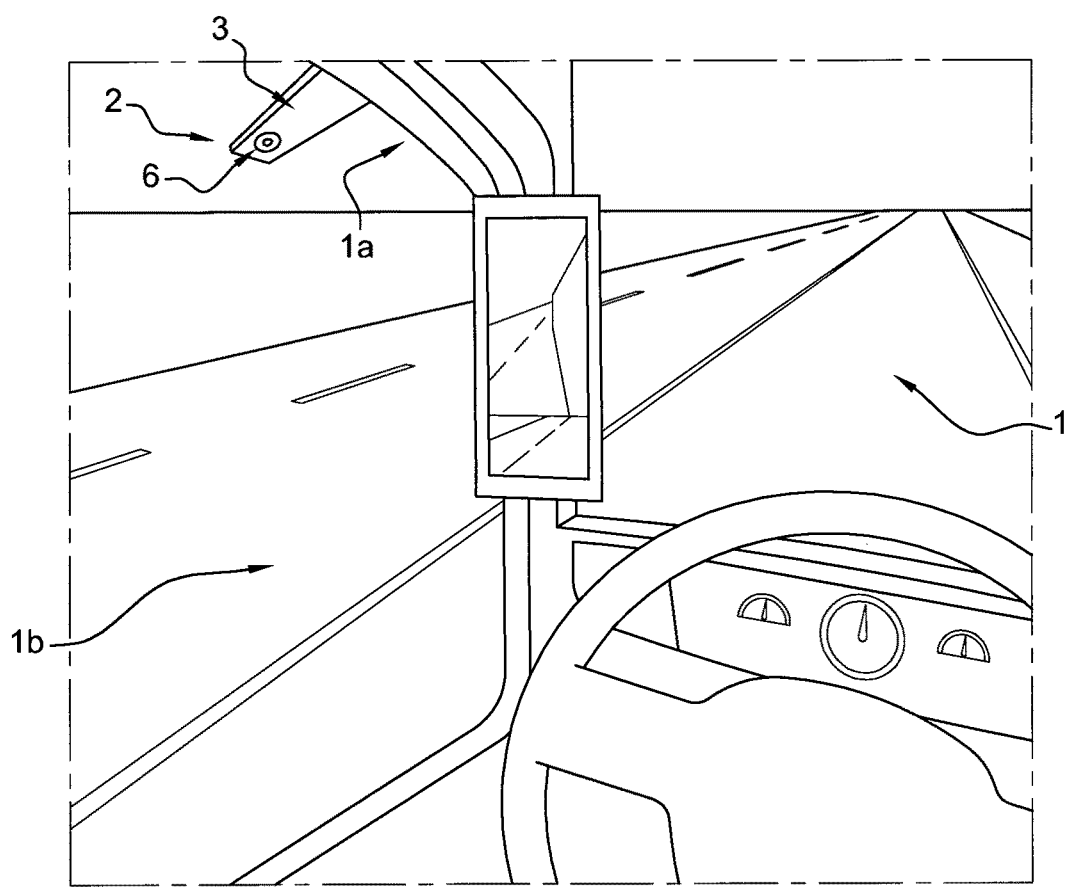
Fig. 1
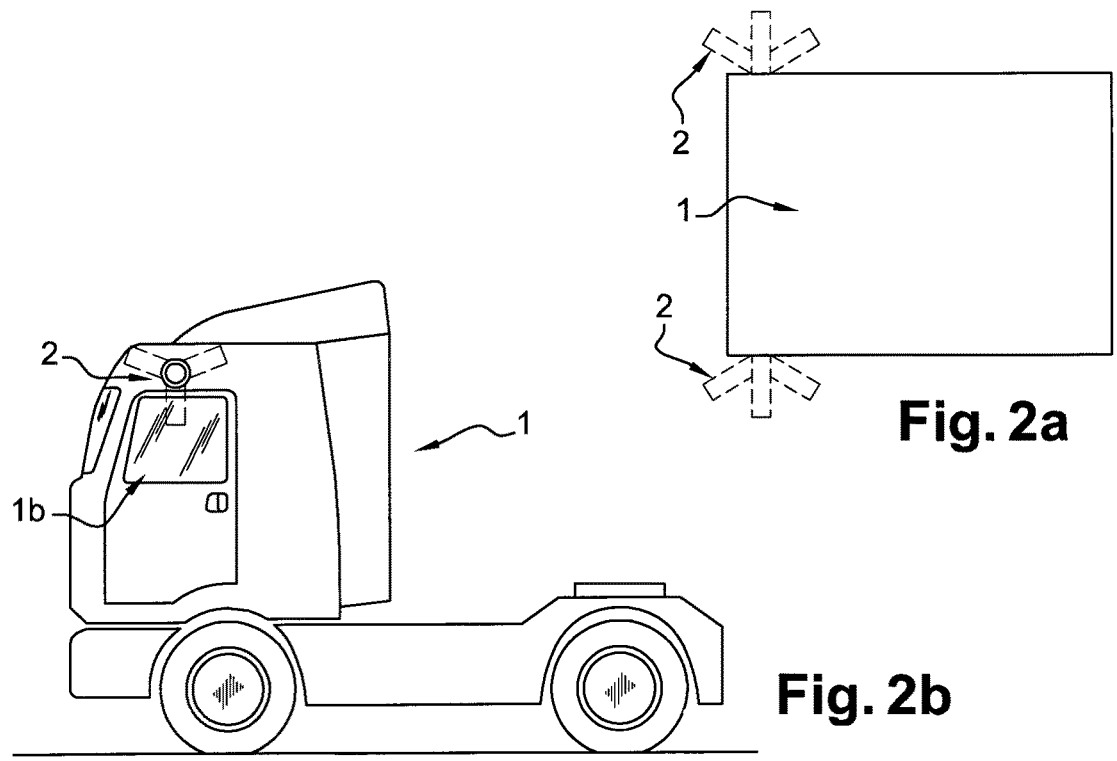
Fig. 2a
Fig. 2b

CAMERA USED AS A VEHICLE SIZE REFERENCE AND VEHICLE EQUIPPED WITH THE SAME

BACKGROUND AND SUMMARY

The present invention is directed to a camera for a vehicle, which is also used as a visual reference for the driver of the vehicle, to manage the external dimensions of the vehicle.

The rear view mirrors tend to be replaced by active optical devices, like cameras, by which a driver can monitor the environment of his vehicle as shown for example in patent applications WO2008/146149, DE102011113323. This allows the reduction of drag resistance and weight, therefore improving the energy consumption. However, the emplacement of such optical devices within the vehicle is crucial to provide the best view to the driver. In particular, dead angles should be avoided and lower parts of the vehicle, especially when the vehicle is a large vehicle, should also be visible to the driver to facilitate his maneuvers within tight environments. To this extent, the optical devices are placed at some strategic positions, like an upper part of a cab, and thus becomes invisible from the driver. Since the optical devices still need to protrude out of the frame of the vehicle to provide the necessary visual information to the driver, there is an increased risk of collision between the optical device and an obstacle when the driver does not see the optical device. Solutions such as the one proposed in patent application WO00/62112 for a power actuated and manual sliding movement of a mirror assembly between a retracted position and an extended position or in DE102015008552 for a position detection unit integrated in the rearview mirror are not sufficient for large vehicles and not adapted for maneuvers within tight environments.

The present invention, according to an aspect thereof, is directed to a vehicle comprising an optical arrangement, with at least one image sensor device to collect visual information and at least one monitor on which the visual information is displayed. The image sensor device is placed outside the vehicle while the monitor is placed inside the vehicle, in the driver's vision area. The image sensor device may be a camera, comprising an optical lens and an electronic sensor, of a CMOS type, or equivalent, and potentially additional elements like beat transfer means, ECU's, electrical connections, and actuators, which are mounted within a housing fixed on the outside surface of the vehicle. Such housing preferably comprises a pedestal to be fixed on the vehicle, and a lens support to maintain the optical lens at a good position to collect the necessary visual information. The lens support may be a hollow body in which is encapsulated all the necessary elements to collect and compute the visual information, and also when necessary mechanical drivers like an electrical actuator. Alternatively, if the lens support is not electrically actuated, a direct mechanical connection may link the lens support to the door of the vehicle in order to urge it out of the door swept upon opening the door.

The lens support is particularly vulnerable toward external obstacles. It is thus articulated onto the pedestal in such a way that it can be folded in a rest position once the vehicle is parked and the doors are locked. In addition, the lens support of the present invention takes further positions, including a driving position, wherein the lens support is within the door swept of the vehicle, in such a way that the driver can see it from his seat, while driving the vehicle. The lens support needs to escape the swept of the door when the driver is opening the door. Thus, the lens support takes a transitory position upon opening the vehicle door, and comes back to a driving position when closing the vehicle door.

The pedestal of the image sensor device is preferably positioned above the vehicle door, or on the A pillar. The lens support is connected to the pedestal in such a way that it is inclined downward with regard to the pedestal.

The terms "downward", "backward", "frontward", "forward", and "upward" should be understood according to the usual orientation of a vehicle, positioned on horizontal ground. Similarly, the terms "vertical" and "horizontal" both refer to the usual orientation, considering the vehicle on horizontal ground. Also the term "transversal" refers to the orientation starting from one side of the vehicle to its opposite side, and the term "longitudinal", when present, refers to the orientation starting from the front of the vehicle to its rear end. The passenger side of the vehicle corresponds here to the right side of the vehicle in its forward direction.

The following preferred features are thus among the present invention:

The image sensor device of the vehicle is fastened outside the vehicle and is at least partly visible from the driver, when the driver is sat on the driver seat, and when the image sensor is at a driving position. Although the driver seat is not referenced in the figures, it obviously designs the place where the driver is installed for driving the vehicle. It results that what is visible by the driver may depend on the size of the driver, the geometry of the vehicle, and the setting of his seat. However, independently of the driver's characteristic, the image sensor device is always visible by him, when it is at the driving position.

The image sensor device comprises a pedestal, fixed on the vehicle along a first axis, and a lens support articulated on said pedestal and oriented along a second axis, wherein the first axis and the second axis form together a certain angle. The first axis preferably corresponds to a transversal axis of the vehicle. It is thus horizontal.

The lens support can be oriented in one of the three limit positions selected from a driving position, a rest position, and an intermediate position, wherein the lens support is within the door swept at the driving position, in such a way to be at least partly visible by the driver, and outside the door swept in the intermediate position and at the rest position.

The lens support may have additional orientations than the driving position, the intermediate position and the rest position. Such additional orientations may be selected by the driver to enlarge his vision field or to orient the image sensor device toward a specific direction.

At the driving position, the lens support is oriented in the same vertical plane as the pedestal and forms with the pedestal an angle comprised between 20° and 60°.

At the rest position and at the intermediate position, the lens support is angled with regard to the vertical plane comprising the pedestal, and the projection of the angle between the lens support and the pedestal corresponding to the rest position, and the projection of the angle between the lens support and the pedestal corresponding to the intermediate position, on this vertical plane comprising the pedestal, are reduced compared to the angle corresponding to the driving position.

The projection on the vertical plane comprising the pedestal of the angles between the pedestal and the lens support corresponding to the rest position and the intermediate position may be equal or different and are preferably comprised between around 10° and around −10°.

The lens support is connected to the pedestal by the mean of a folding connection, which comprises a beveled surface, orthogonal to a non-vertical axis. In particular, this non-vertical axis forms a third angle with the axis along which is oriented the pedestal, which is preferably comprised between 10° and 60°.

The lens support automatically moves from the driving position to the intermediate position upon opening a vehicle door. In addition, it can automatically move to the rest position upon locking the door. It can further automatically move from the intermediate position to the driving position upon closing the door, or after a certain temporization T after the door is closed, or upon activating a command of the vehicle. Such a command may be for instance a gear lever, a clutch pedal, and the ignition switch of the engine.

The lens support may, alternatively or in addition, be physically linked to the vehicle door, in such a way that it is urged outside the door swept upon opening the door.

The present invention is further directed to a method of managing one or more image sensor device of a vehicle. The image sensor device is as described herein, and preferably comprises a lens support, which is preferably automatically positioned at one of the three positions selected from a driving position, a rest position and an intermediate position upon activation of a vehicle command. The vehicle command may be selected from a door handle or door actuator, a door lock, an ignition switch, a gear lever, or a clutch pedal. A door lock may be remotely controlled with a key fob or any equivalent mean. According to the method of the present invention, the lens support is automatically placed within the door swept at the driving position, and is moved out of the door swept at the rest position and at the intermediate position. The method of the present invention may comprise a manual step wherein the driver can manually select the position of the image sensor device.

The present invention further include an image sensor device, which can take any one of the driving position, wherein the lens support is within the door swept, and the intermediate and rest positions, wherein the lens support is outside the door swept. Such an image sensor may take additional position depending on specific usages. To this extend the image sensor device preferably comprises a pedestal, a lens support articulated on the pedestal through a folding connections, wherein the folding connection comprises a beveled interface with a first beveled surface of the pedestal and a second beveled surface of the lens support.

BRIEF DESCRIPTION OF THE DRAWINGS

FIG. 1: view of the image sensor device (2) at its driving position, from the driver seat.

FIG. 2a: Top view of the vehicle with 2 image sensor devices (2) at their three limit positions FIG. 2b: lateral view of a vehicle with an image sensor device (2) at its three limit positions FIG. 3 represents a back view of an image sensor device at the passenger side of the vehicle, wherein the lens is directed backward.

DETAILED DESCRIPTION

Figure 3:
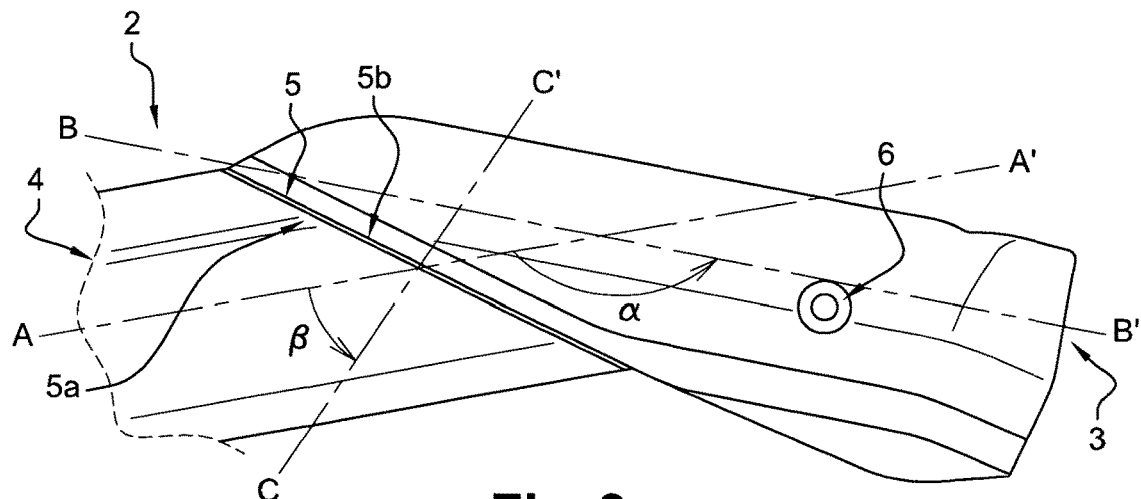
FIG. 3: Details of an image sensor device (2) at the driving position.
Figure 4A:
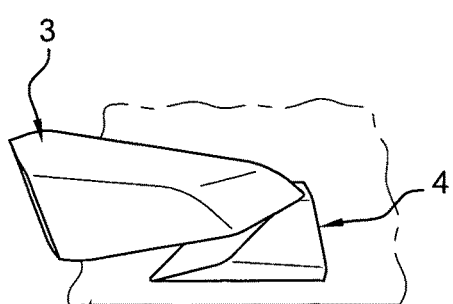
FIG. 4a, 4b, 4c: details of the image sensor device (2) at its intermediate position (4a), driving position (4b) and rest position (4c).
Figure 4B:
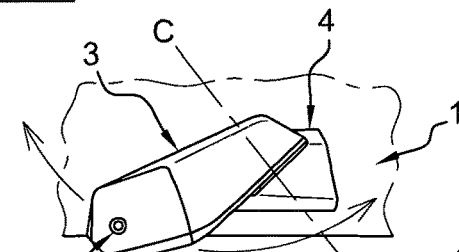
Figure 4C:
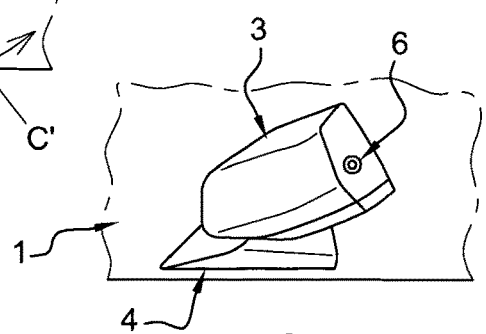

The vehicle (1) of the present invention, comprising a door (1a) with a window (1b), is provided with an optical arrangement comprising at least one image sensor device (2), with a lens support (3) and a pedestal (4), wherein the pedestal (4) is fixed on an external surface of the vehicle (1), and wherein the lens support (3) is articulated with regard to the pedestal (4) by the mean of a folding connection (5). The lens support (3) comprises at least a lens (6). It may also comprise or contain the technical elements necessary to record, compute, transmit and process the visual information. Such technical elements, not shown, comprise one or more of ECU, optical sensor like CMOS, one or more Heat transfer elements to reduce the temperature, and electrical connections. The lens support (3) may be made in plastic or any other polymer material. It can alternatively be made in metal like aluminum, or in a metallic alloy. The lens support (3) can take several positions with regard to the pedestal (4). The pedestal (4) is preferably fixed to the vehicle along horizontal axis AA', which is transversal to the width of the vehicle (1). However, any other inclination may be envisaged for specific uses.

A first limit position may be a driving position (DP), wherein the lens support (3) extends in the same vertical plane than the pedestal (4) and is inclined downward by a certain angle $\alpha$ with respect to the pedestal (4). In other words, the lens support (3), oriented along an axis BB', is inclined with regard to the pedestal (4), oriented along the axis AA'. The angle $\alpha$ corresponds to the angle between the axis AA', and the axis BB' when the pedestal (4) and the lens support (3) are in the same vertical plane, which is the case at the driving position (DP). When the lens support (3) is no longer in the same vertical plane the pedestal, then a denotes the projection of the angle between the axis AA', and the axis BB', onto the vertical plane comprising the axis AA', which is the case for the rest position (RP) and the intermediate position (IP) described below. In other words, $\alpha$DP for the driving position, corresponds to the angle between the axis AA', and BB' while the angles $\alpha$RP for the rest position and $\alpha$IP for the intermediate position, corresponds to the corresponding projection of the angle between the axis AA' and BB' on the same vertical plane comprising the axis AA'.

In the driving position (DP), $\alpha$DP may be comprised between around 20° and around 60°, preferably around 30° and 50°, more preferably between 35 and 45°. In such a position, the image sensor device (2) is at least partly visible by the driver from his seat, when he is driving the vehicle (1). In particular, the distal part of the lens support (3) is within the vision field of the driver. When the vehicle is equipped with two lateral image sensor devices (2), both being disposed on the opposite sides of the vehicle, they are not necessarily visible in the same way by the driver. Thus, in a preferred configuration, the lens support (3) is inclined downward in such a way that its distal end comes below a horizontal plane passing through the top edge of the lateral window. In such a driving position, the driver sees both lateral image sensor devices (2). At the driving position, the lens (6) is oriented to collect the visual information necessary to drive the vehicle. In particular, the lens (6) is oriented to collect visual information behind the vehicle if the image sensor device (2) has a function of a rear view camera. Due to the angle $\alpha$DP, the driving position places the lens support (3) within the door swept of the vehicle.

A second position may be a rest position (RP), wherein the image sensor device (2) is folded with regard to the pedestal (4), in such a way that the distal end of the lens support (3) comes closer the vehicle surface on which is fixed the pedestal (4). At this rest position, the lens support (3) is no longer in the same vertical plane than the pedestal (4). The lens support (3) is angled, or even orthogonal, to the vertical plane comprising the pedestal (4), while the angle αRP is reduced, or even inversed, compared to its initial value αDP at the driving position (DP). The angle αRP is therefore comprised between around 10° and around 0°, or even −10°, if the lens support (3) is oriented upward. Independently of the orientation of the lens support (3), one should understand that at rest position, the image sensor device (2) is folded in a non-active position, wherein the lens (6) cannot collect the visual information necessary to the driving of the vehicle, and wherein it is preferably switched off. In a preferred configuration, at rest position (RP), the lens support (3) is oriented backward with regard to the driving direction of the vehicle. The rest position (RP) is convenient when the vehicle is parked for a long, and/or undefined time, and wherein the door is locked. This also corresponds to a time frame wherein the driver is absent from the vehicle. Under these conditions, there is no necessity to maintain any residual energy to the image sensor device (2), and all its electrical elements are switched off. Such a rest position allows to limit or prevent damages on the image sensor device (2) from an external element such as a third running vehicle. Contrary to the driving position (DP), the rest position maintains the lens support (3) outside the door swept of the vehicle.

The image sensor device (2) also takes an intermediate position (IP) to avoid any collision with the vehicle door upon opening it. At such an intermediate position (IP), the lens support (3) moves away from the door swept while remaining functional. The orientation of the lens support (3) at the intermediate position (IP) may be the same as at the rest position (RP). Alternatively, the lens support (3) may have a different orientation at the intermediate position (IP). For example, at the intermediate position, the lens support (3) may rotate frontward with respect to the driving direction, while it rotates rearward at the rest position. However, the reverse arrangement is still possible, wherein the lens support (3) is oriented frontward at rest position (RP) and backward at the intermediate position (IP). To this extend, the lens support (3) is no longer in the same vertical plane than the pedestal (4). It is angled, or even orthogonal to the vertical plane comprising the pedestal (4), while the angle αIP is reduced, or inversed, compared to its initial value αDP at the driving position. The angle αIP is therefore comprised between around 10° and around 0°, or even −10°, if the lens support (3) is oriented upward. The value of αIP may be equal or different from αRP. A different orientation of the lens support (3) provides the advantage to easily identify the status of the vehicle from outside. The intermediate position (IP) is preferably temporary, while the engine of the vehicle is still running, or when a certain level of energy is still supplied to the vehicle equipment. This can be the case when the driver is still in the cab, for example at rest in the living part, or working within the cargo body or around the vehicle. The intermediate position (IP) is at least triggered by actuating a door of the vehicle. In case two lateral image sensor devices (2) are positioned at two opposite sides of the vehicle, each of them may react individually to the corresponding door. Alternatively, both image sensor devices (2) may simultaneously take the intermediate position (IP) as soon as one of the doors is opening. However, other additional parameters may be considered to position the lens support (3) at the intermediate position. For example, once the driver stops the engine while remaining within the cab, the lens support (3) may automatically adopt the intermediate position despite the fact that the door has not been opened. Alternatively, a command like a push button on the dashboard, or directly integrated to a command of the cameras, may allow the driver to manually place the image sensor devices (2) in one or the other of the driving position, the rest position, and the intermediate position. In an advantageous configuration, the lens (6) is oriented upward when the lens support (3) is at the intermediate position, in such a way that the top of the cab, or the top of the cargo body, may be monitored by the driver. This may be useful when passing under a low bridge or any other obstacle which represents a risk of collision with the upper part of the vehicle (1).

The lens support (3) can thus move from one of the positions to any one of the others. From the driving position (DP), it can in particular come at the intermediate position (IP) as soon as the driver opens the door. It can in addition come at the intermediate position upon stopping the engine while keeping a residual energy to the vehicle equipment. It can then directly fold at the rest position (RP) upon locking the door. It may come back at the driving position (DP) once the driver closes the door, or after a temporization T. Such a temporization allows to confirm whether the door is locked or whether the driver intends to drive before orienting the lens support (3). More particularly, a temporization T of around 1 to 3 seconds may be considered from the intermediate position (IP) after which the lens support (3) automatically comes back to its driving position (DP) if the door is not locked meanwhile. Otherwise, the lens support (3) folds at the rest position (RP) upon locking the door. Also, from the rest position the lens support (3) may directly come to the driving position (DP) upon switching on the engine, or closing the door. Alternatively it can adopt the intermediate position (IP). Any other parameters may also be considered to move the lens support (3) from its intermediate position (IP) to its driving position (DP). For example, the intermediate position may be maintained as long as the driver remains in the cab. The particularity of the intermediate position being that the optical lens (6) remains active, the visual information may still be transferred toward the monitor inside the cab. Thus, the driver has still the opportunity to view the surrounding of his vehicle. The lens support (3) can then directly fold from the intermediate position (IP) to the rest position (RP) upon locking the door. Alternatively, it can come back to the driving position (DP) upon switching on the engine.

The folding connection (5), linking the pedestal (4) to the lens support (3), allows the rotation of the lens support (3) with regards to an axis, which can be vertical, or non-vertical. The folding connection (5) preferably allows a rotation of the lens support (3) along a non-vertical axis, in such a way that the projection αRP of the angles at rest position (RP) and the projection αIP of the angle at the intermediate position on the vertical plane comprising the axis AA', are lower than the angle αDP at the driving position (DP). Under such conditions, the lens support (3) rotates along an axis CC', comprised within the same vertical plane comprising the axis AA', and which forms an angle β with regard to the axis AA', corresponding to the orientation of the pedestal (4). The angle β is preferably comprised between around 10° and around 60°. It is preferably comprised between around 30° and around 50°. To this extend, the lens support (3) is connected to the pedestal (4) through a beveled interface, the plane of which is orthogonal to the axis CC'. The beveled interface is composed of a beveled surface (5 *a*) of the pedestal (4) and a complementary beveled surface (5 *b*) of the lens support (3). When folding from the driving position (DP) to a backward position, corresponding either to the rest position (RP) or the intermediate position (IP), the lens support (3) is thus allowed to twist around its axis BB' in such a way that the lens (6) changes from a rearward orientation to an upward orientation. The orientation of the lens (6) denotes its optical sensing direction. When folding from the driving position (DP) toward a frontward direction, corresponding either to the rest position (RP) or the intermediate position (IP), the lens support (6) is allowed to twist around its axis BB' in such a way that the lens (6) changes from a rearward orientation to a downward orientation. Thus, depending on the specific settings of the vehicle, the rest position (RP) may be frontward and the intermediate position (IP) may be backward, allowing the lens (6) monitor the top part of the vehicle, to help the driver passing through low obstacles. On the contrary, the intermediate position (IP) may be frontward, with the lens (6) oriented downward, in such a way that the driver, while still in the cab, can monitor the surrounding of the vehicle. The rest position (RP) would then be backward.

The present image sensor device (2) thus comprises an actuator, not shown, able to move the lens support (3) from one to the other one of the above-mentioned positions. The actuator is preferably an electrical actuator, included within the pedestal (4) or within the lens support (3). It may alternatively be a mechanical link to the vehicle door, that urges the folding of the lens support (3) upon opening the door. Such a specific mechanical connection only allows a direct folding move with the door actuation. In order to trigger the move of the lens support (3) with other commands of the vehicle, one or more electrical or electronic connections may be established with several sensors within the vehicle, such as the door sensor, a gear position sensor, a clutch sensor or a speed sensor.

The present invention thus provides a method of management of one or more image sensor devices (2), wherein the lens support (3) of said image sensor devices (2) can take two or more positions, preferably three positions selected from a driving position (DP), a rest position (RP) and an intermediate position (IP), as defined above. The present method allows to manage the automatic transition of the image sensor devices (2) from one to the other position, upon action of the driver on certain commands, including a door actuator, a door locking, the ignition of the engine, a gear, the clutch, or any other command of the vehicle (1). The present method may in addition allow the driver to manually place the image sensor devices (2) in one or the other of the above-mentioned positions. Additional positions may also be available under request of the driver.

Figure 5:
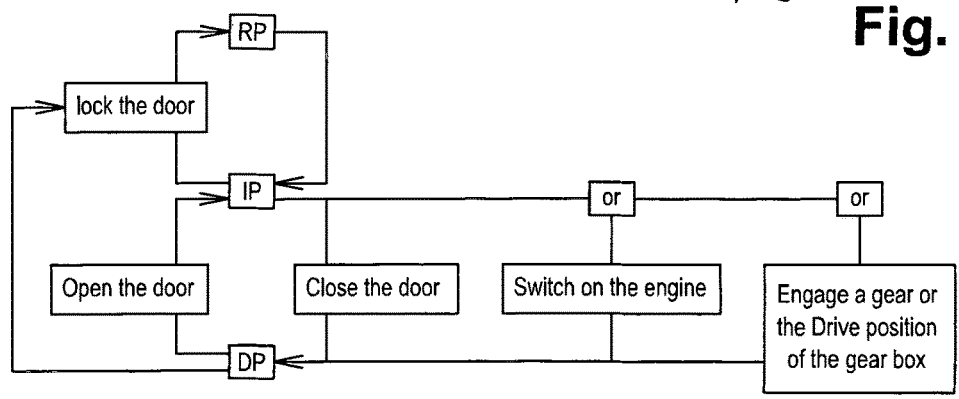
FIG. 5: Example of the method managing the image sensing device orientation

The sequence depicted in FIG. 5 is provided as an example, knowing that one skilled in the art will be able to modulate and adapt it within the frame work of specific needs. In this sequence, the lens support (3) moved from the rest position (RP) to the intermediate position (IP) upon unlocking the door. The reverse pathway is possible, meaning that the lens support (3) moves from it intermediate position (IP) to the rest position (RP) upon locking the door. The driver opens the door and closes the door, indicating that he has come into the vehicle. The lens support (3) then automatically moves from its intermediate position (IP) toward the driving position (DP), either upon closing the door or after a temporization T. Alternatively, the lens support (3) moves from the intermediate position (IP) to the driving position (DP) only when the driver switches on the engine, or engages a first gear or places the gear box lever at the drive position. From the driving position (DP), the lens support (3) automatically comes back to the intermediate position (IP) when the driver opens the door.

The present invention further includes the image sensor device (2), comprising a pedestal (4) and a lens support (3), wherein the pedestal (4) and the lens support (3) are connected through a beveled folding connection (5). In particular the folding connection (5) comprises a beveled interface with a first beveled surface (5 a) of the pedestal (4) and a second beveled surface (5 b) of the lens support (3), complementary to the first beveled surface (5 a), and in that both the lens support (3) and the pedestal (4) may be within a first plane, or angled with respect to said plane. The lens support (3) may be angled to the pedestal (4) with regard to the first plane either in one direction or the opposite direction. In addition, when being in the same first plane as the pedestal (4), the lens support (3) is angled to said pedestal (4) with respect to a second plane orthogonal to the first plane.

The invention claimed is:

1. A vehicle comprising a driver seat, a vehicle frame and a door hinged to the vehicle frame, and at least one image sensor device with a lens support and a pedestal, wherein the pedestal is fixed on an external surface of the vehicle along an axis AA', and the lens support is articulated on the pedestal and oriented along an axis BB' forming an angle α with the axis AA', wherein the lens support can be oriented in at least three positions selected from a driving position (DP), a rest position (RP) and an intermediate position (IP) wherein the lens support is within the door swept at the driving position (DP), and outside the door swept in the intermediate position (IP) and at the rest position (RP) and wherein a distal end of the lens support is within a vision field of a driver when the driver is seated in the driver seat and when the lens support is at the driving position (DP).

2. The vehicle according to claim 1, wherein at the driving position (DP), the lens support is oriented in a same vertical plane as the pedestal and forms with the pedestal an angle αDP comprised between 20° and 60°.

3. The vehicle according to claim 2, wherein at the rest position (RP) and at the intermediate position (IP), the lens support is angled with regard to the vertical plane comprising the pedestal, and a projection of an angle (αRP) corresponding to the rest position (RP) and a projection of an angle (αIP) corresponding to the intermediate position (IP) on the vertical plane comprising the pedestal are reduced compared to an angle (αDP) for the driving position (DP).

4. The vehicle according to claim 3, wherein the angles αRP and αIP may be equal or different and comprised between around 10° and around −10°.

5. The vehicle according to claim 1, wherein the lens support is connected to the pedestal by a folding connection.

6. The vehicle according to claim 5, wherein the folding connection comprises a beveled surface orthogonal to a non-vertical axis CC'.

7. The vehicle according to claim 6, wherein the axis CC' forms an angle β with the axis AA' along which is oriented the pedestal, wherein β is comprised between 10° and 60°.

8. The vehicle according to claim 1, wherein the lens support automatically moves from the driving position (DP) to the intermediate position (IP) upon opening the door.

9. The vehicle according to claim 1, wherein the lens support automatically moves to the rest position (RP) upon locking the door.

10. The vehicle according to claim 1, wherein the lens support automatically moves from the intermediate position (IP) to the driving position (DP) upon closing the door, or after a certain temporization T after the door is closed, or upon activating a command of the vehicle.

11. The vehicle according to claim 10, wherein the command is selected from the group consisting of a gear lever, a clutch pedal, and an ignition switch of an engine.

12. The vehicle according to claim 1, wherein the lens support is inclined downward in such a way that the distal end comes below a horizontal plan passing through a top edge of a lateral window.

13. A method of managing one or more image sensor devices of a vehicle, wherein the one or more image sensor devices comprise a lens support, the method comprising the step of:
 automatically positioning the lens support at one of three positions selected from a driving position (DP), a rest position (RP) and an intermediate position (IP) upon activation of a vehicle command, the lens support being placed within a door swept at the driving position (DP), and being moved out of the door swept at the rest position (RP) and at the intermediate position (IP).

14. The method according to claim 13, wherein the vehicle command is selected from the group consisting of a door actuator, a door lock, an ignition switch, a gear lever, and a clutch pedal.

15. An image sensor device comprising a pedestal, a lens support articulated on the pedestal through a folding connection, wherein the folding connection comprises a beveled interface with a first beveled surface of the pedestal and a second beveled surface of the lens support, and both the lens support and the pedestal may be within a first plane, or angled with respect to the first plane, wherein the image sensor device further comprises an actuator that is:
 an electrical actuator, included within the pedestal or within the lens support able to move the lens support from one position to another position amongst at least three positions selected from a driving position (DP), a rest position (RP), and an intermediate position (IP) wherein the lens support is within a door swept at the driving position (DP), and outside the door swept in the intermediate position (IP) and at the rest position (RP); or
 a mechanical link to the door that urges folding of the lens support upon opening the door.

16. The image sensor device according to claim 15, wherein the lens support may be angled with regard to the first plane in two opposite directions.

17. The image sensor device according to claim 15, wherein when being in the same first plane as the pedestal, the lens support is angled to the pedestal with respect to a second plane orthogonal to the first plane.

* * * * *